United States Patent [19]

Bruggeman

[11] Patent Number: 4,810,123

[45] Date of Patent: Mar. 7, 1989

[54] FOUNTAIN APPLICATOR HANDLE WITH SPECIFIC CHECK VALVE

[75] Inventor: William L. Bruggeman, St. Francis, Minn.

[73] Assignee: Power Flo Products Corp., Minneapolis, Minn.

[21] Appl. No.: 49,330

[22] Filed: May 13, 1987

[51] Int. Cl.[4] .......................... B65B 3/04; B05C 1/10; F16K 15/16

[52] U.S. Cl. .......................... 401/144; 137/846; 401/197; 141/18

[58] Field of Search ................ 137/846, 847; 401/197, 401/144; 141/18

[56] References Cited

U.S. PATENT DOCUMENTS

| | | | |
|---|---|---|---|
| 615,751 | 12/1898 | Sands | 137/846 |
| 2,443,981 | 6/1948 | Funk et al. | 141/18 X |
| 2,517,551 | 8/1950 | Eckman . | |
| 2,576,192 | 11/1951 | Poznik | 137/847 X |
| 2,632,904 | 3/1953 | Halecky . | |
| 2,722,029 | 11/1955 | Barnes et al. . | |
| 2,964,769 | 12/1960 | Mercereau . | |
| 3,231,151 | 1/1966 | Clark et al. . | |
| 3,337,899 | 8/1967 | Rentfrow | 401/144 X |
| 3,422,844 | 1/1969 | Grise . | |
| 3,504,699 | 4/1970 | Grise | 137/846 |
| 3,554,659 | 1/1971 | Stokes . | |
| 3,612,707 | 10/1971 | Herbrechter et al. . | |
| 3,702,739 | 11/1972 | Rentfrow . | |
| 3,822,720 | 7/1974 | Souza | 137/846 |
| 4,067,414 | 1/1978 | Funke | 137/846 X |
| 4,434,810 | 3/1984 | Atkinson | 137/847 X |
| 4,436,519 | 3/1984 | O'Neill | 137/847 X |
| 4,695,176 | 9/1987 | Simonette et al. | 401/144 |

FOREIGN PATENT DOCUMENTS

| | | | |
|---|---|---|---|
| 735590 | 8/1955 | United Kingdom . | |
| 2094443 | 9/1982 | United Kingdom | 137/846 |

*Primary Examiner*—Steven A. Bratlie
*Attorney, Agent, or Firm*—Peterson, Wicks, Nemer & Kamrath

[57] ABSTRACT

A fountain applicator handle is disclosed for providing a continuous supply of a liquid coating to an applicator head for application onto a surface. The fountain applicator handle includes an elongated hollow reservoir with a sliding displacement piston disposed therein. A valve body is attached thereto and adapted for attachment to a coating supply, with the valve body allowing the communication of the coating into the reservoir while preventing the outflow of the coating to the applicator, and controllably communicating the coating from the reservoir to the applicator. Specifically, a fill tube is insertable through a check valve and sealable in a tapered segment in the fill channel of the valve body. In the most preferred form, the check valve is biased in a closed position independent of back pressure of the liquid coating. Particularly, in the most preferred embodiment, the plates of the check valve intersect with the inner surface of a cylindrical shroud, with ribs formed on the outer surface of the cylindrical shroud being press fit in the fill channel for preloading the plates together.

20 Claims, 2 Drawing Sheets

FOUNTAIN APPLICATOR HANDLE WITH SPECIFIC CHECK VALVE

CROSS REFERENCE

This is a companion to commonly owned application Ser. No. 826,197 filed Feb. 5, 1986, now U.S. Pat. No. 4,695,176.

BACKGROUND

1. Field of the Invention

The present invention pertains to a portable fountain applicator handle for providing a continuous flow of a liquid coating to an applicator head. In another aspect of the present invention, the present invention pertains to a check valve which is preloaded to close independent of back pressure.

2. Description of the Prior Art

In order to enhance the beauty of and protect the surface of various items in his environment, man has applied various protective coatings thereto. Most commonly the coating applied is in the nature of a paint, however numerous other coatings such as shellac, varnish, white wash, or oil finishes are also used in certain instances. When the surface being coated is a flat surface, the coating is typically applied using a brush, a roller, or a powered spray gun.

When the coating is applied to a large uniform surface, it is necessary that an even layer of the coating be expeditiously applied covering the entire surface with a minimum amount of spillage or spatter to adjacent surfaces. Previously, the coating has been applied by dipping the brush, roller, or other applicator in a pool of the liquid coating and when the applicator obtained a proper quantity of the coating, moving the applicator to the surface being coated and applying the coating to the surface. While this system does work, it has the dual disadvantages of providing a varying quantity of coating to the surface and dripping the coating onto other environmental surfaces creating an unsightly and difficult to clean mess.

The application of the varying amounts of coating to surfaces requires the operator to make multiple passes of the applicator over the surface being coated to produce a uniform film of the coating. When multiple passes are not made to level the coating film, unsightly drips, runs, or "lace-curtains" often result. In addition, the application of an uneven layer of coating causes, in some instances, uneven life of the coating manifested by premature chipping or peeling of the coating from the surface. Multiple passes over the coated surface require increased operator time spent on coating a given surface.

The increase in time both decreases the operator's productivity and increases the cost of coating the surface.

When the applicator is periodically refilled from the coating pool, it is advantageous that the operator maximizes the amount of coating being moved to the surface. In maximizing the quantity of coating being transferred, however, the operator increases the probability of drippage from the applicator into the environment when the applicator is moved from its filling area to the surface being coated. Such drippage and spillage is at the very least unsightly and is potentially damaging to the surface spilled upon. To prevent the spillage, it has been common practice to lay down drop clothes and the like to prevent such spillage. The additional step of laying down drop clothes caused further expenditures of time and money and decreases the efficiency of the entire process.

The art is replete with various solutions to the problems inherent in simple brushes and rollers. The continuous feed solutions tend to fall into two classes, external coating feeds and internal coating feeds. External coating feed devices are typified by having an external coating container attached through the handle to the applicator using a flexible hose, with a pump urging the coating through the hose and handle thence into the applicator. Devices of this class, while resolving the difficulties of periodically refilling the coating applicator, tend to be rather large and require a certain amount of set up time and also a power source. Typically these devices draw the coating from a large reservoir and thus are more suited for applying the coating to large expanses of surfaces since the reservoir must be emptied and cleaned, or changed and the pump, the hose, the handle, and the applicator must be cleaned before another color or type of coating may be used in this system.

The second group of applicators are typified by having a coating reservoir integrated into the handle of the device and means providing a controlled flow of coating to the applicator. These applicators do not need to be repeatedly moved between a coating pool for refilling and the surface being coated thereby minimizing or eliminating the opportunity of coating drippage into the environment. These applicators provide an essentially continuous, uniform flow of the coating to the applicator head in turn providing a uniform layer of coating transferred to the surface with a minimum of applicator passes over the surface.

Prior art is replete with unitary devices wherein a reservoir handle is attached to an applicator. One such device is disclosed in U.S. Pat. No. 3,337,899 issued Aug. 29, 1967, to J. Rentfrow. The Rentfrow patent discloses the roller with attached reservoir handle. The reservoir handle feeds a continuous supply of paint to the roller assembly in response to spring pressure. The coating flow to the applicator may be controlled thereto by a valve disposed in the supply pipe. The Rentfrow paint dispenser, like all other unitary paint dispensers, must contain a reasonable small reservoir so the paint applicator may be conveniently moved along the surface being coated. The use of the small reservoir requires the periodic filling. In refilling, a fill pipe must first be attached, the fill valve opened, and the fill handle retracted against the pressure of the feed spring. This procedure tends to be rather inconvenient and clumsy.

Drawing the fill handle against the urgings of the feed spring, the operator must hold the entire assembly steady with the fill pipe submerged in the container. After retracting the fill handle, the operator must close the fill valve and remove the fill pipe before the paint dispenser can be reused.

U.S. Pat. No. 3,554,659 issued to R. E. Stokes on Jan. 12, 1971, attempts to resolve the refilling problems by filling the removable paint container attached to the applicator handle. While this does make for a more convenient refilling of the paint applicator, it does limit the position in which the paint applicator may be used and prohibits inverting the applicator. Should the applicator be inverted, paint in the reservoir would obviously spill over the environment. Likewise, if the applicator were used to paint an overhead surface such as a ceiling, the supply container is now tipped on its side, a position where leakage is quite likely to occur.

U.S. Pat. No. 3,612,707 issued to Charles Herbrechter on Oct. 12, 1971, discloses another attempt at providing a self contained unitary applicator that can be conveniently refilled. The paint roller handle has a spring actuated deformable container defining its reservoir. The springs may be held compressed by detents. The roller is refilled by removing an end cap and pouring coating material into the expended reservoir.

While this resolves the inconvenience and clumsiness of retracting the spring loaded handle while maintaining a fill pipe in the paint container, it necessitates the use of a coating container from which the coating material may be conveniently poured from and further requires the roller be held in an upright and vertical position for refilling. Where the coating purchased in large volume containers, such as five gallon pails, this arrangement would necessitate the transfer of the coating to an intermediate container for transfer into the paint roller handle.

The known prior art has not been able to effectively overcome the construction, refilling, and convenience problems in this area.

OBJECTS OF THE INVENTION

The object of the invention is to provide a unitary paint applicator handle and reservoir with an improved self actuated filler valve.

The object of the invention is to provide a unique check valve which prevents undesired leakage.

It is another object of the invention to provide such a check valve which is preloaded to close independent of back pressure.

It is another object of the invention to provide such a check valve having its opening biased in a closed position by its press fitting in the valve body.

It is another object of the invention to provide such a check valve allowing insertion of a fill tube therethrough without detriment to the check valve.

It is another object of the invention to provide such a check valve which retains its memory.

It is another object of the invention to provide such a check valve which helps prevent leakage even in the event of loss of valve memory.

It is another object of the invention to provide a fountain applicator operable in any position.

The further object of the invention is to provide a fountain applicator adaptable to be easily refilled from any size of coating container.

These and other objects of the invention will become manifest in the art upon review and usage of the teachings herein.

SUMMARY OF THE INVENTION

According to the principles of the present invention, the fountain applicator comprises a clear tubular handle with a valve body at one end. A displacement piston slides within the reservoir fountain handle of the applicator. The valve body has a central channel passing longitudinally thereto communicating the paint from the reservoir contained in the handle into the applicator.

The radial channel extends diagonally from the periphery of the valve body intersecting the central channel. The fill channel has a one way check valve disposed in it at the periphery of the valve boy. A tapered seat is disposed coaxially to the radial channel intersecting the central channel having dimensions to accept a fill tube.

When filling the reservoir, the fill tube is inserted into the fill channel through the check valve and seals into the tapered seat. When the displacement piston is moved away from the valve body, the coating is directed into the reservoir by the fill tube while preventing flow to the applicator head due to its sealing in the tapered seat. With the reservoir filled, the fountain applicator is removed from the fill tube thereby allowing the check valve to reseal and preventing the flow of coating out from the fountain applicator.

In another aspect of the present invention, a check valve is provided having a member for preloading the valve plate for closing the valve opening independent of fluid passage to prevent leakage of fluid past the check valve even in the absence of fluid back pressure.

In its preferred form, the valve plate intersects and is integrally formed with a shroud having ribs integrally formed on the outer surface thereof for press fitting in the fluid channel for placing a force on the shroud which in turn preloads the valve plate into its closed position.

These and other aspects and manifestations of the invention will become manifest to those versed in the art upon reference to and reviewal of the teachings herein.

BRIEF DESCRIPTION OF THE DRAWINGS

FIG. 2 is an overall perspective view of the fountain applicator handle showing a paint roller attached as the applicator head and a brush applicator.

FIG. 4 is a longitudinal cross sectional view of the fountain applicator handle similar to FIG. 3 with the fill pipe removed.

FIG. 5 is a perspective view of the duck bill style check valve.

FIG. 6 is an overall perspective view of an attachable pivoting paint pad applicator.

FIG. 7 is a cross sectional view of the duck bill style check valve of FIG. 5 taken approximately along 7—7 of. FIG. 5.

FIG. 8 is a cross sectional view of the duck bill style check valve of FIG. 5 taken approximately along 8—8 of FIG. 7.

FIG. 9 is a top plan view of the duck bill style check valve of FIG. 5.

DESCRIPTION OF THE PREFERRED EMBODIMENT

Figure 1:
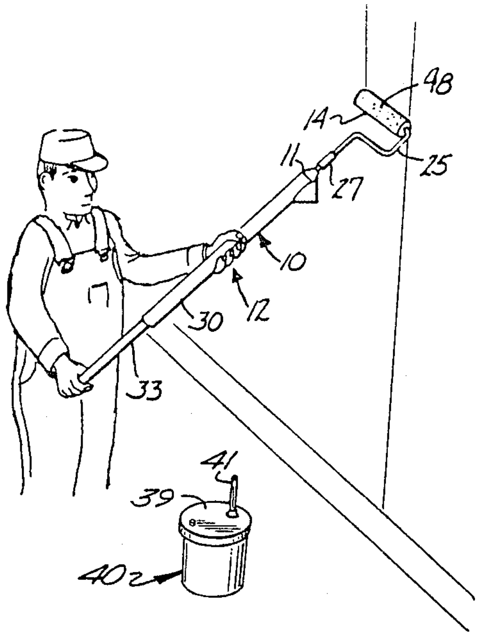
FIG. 1 is an overall illustration showing an operator using the fountain applicator handle to apply paint to a wall.
Figure 3:
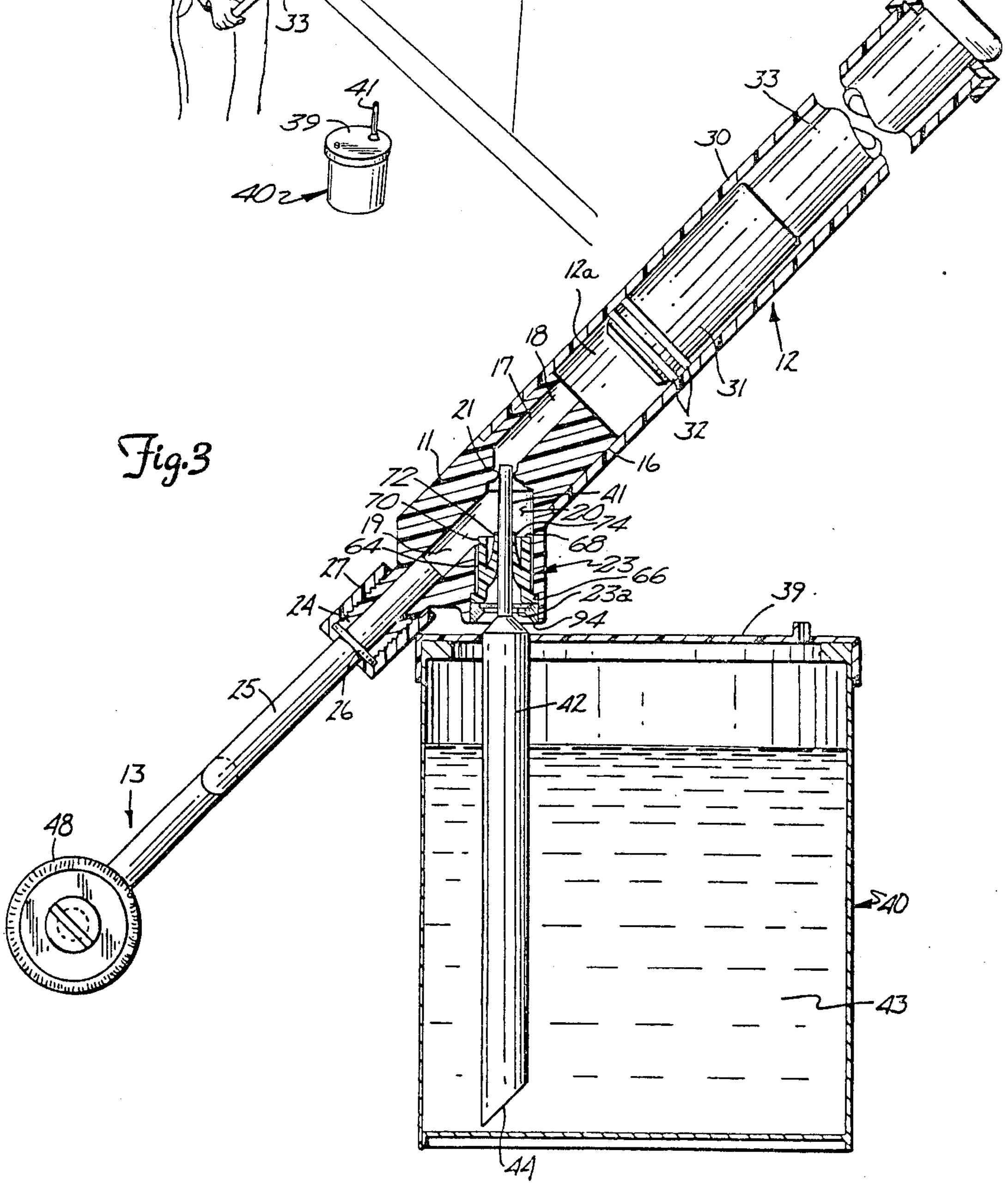
FIG. 3 is a longitudinal cross sectional view of the fountain applicator handle taken approximately along 3—3 of FIG. 2 showing the fill pipe inserted for filling of the applicator.
Figures 2, 4, 5, 6, 7, 8, 9:
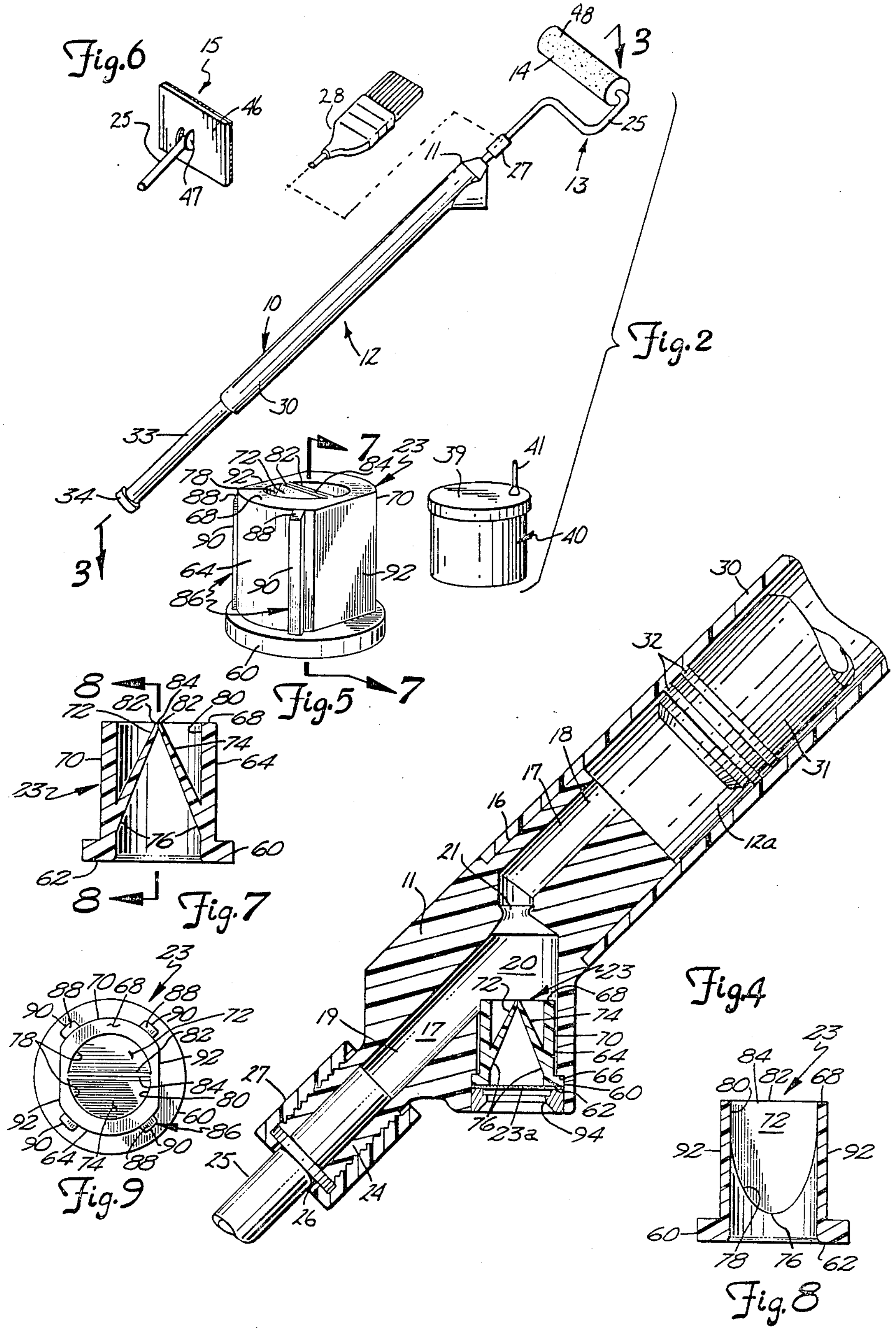

Fountain applicator handle 10 is composed of valve body 11, reservoir tube 12, and applicator head 13. The applicator head may be either a roller type head, a fountain type paint pad 15, or a brush applicator 28.

The valve body 11 is formed from a single piece of polymeric material and has a reduced diameter portion 16 adjacent the reservoir tube 12. A longitudinal central channel 17 extends through the valve body 11. The central channel 17 has an inlet channel 18 adjacent the reservoir tube 12 and an outlet channel 19 adjacent the applicator head 13. A radial channel 20 extends from the outer periphery of the valve body 11 across the central channel 17 at the intersection of the channel 18 and outlet channel 19.

A tapered seal 21 is disposed at the intersection of the radial channel 20 and the inlet channel 18 of the valve body 11. The seal 21 may be a separate element such as an "O"-ring and preferably is a tapered seat formed in the valve body 11. An enlarged diameter recess 22 is formed in the radial channel 20 adjacent to the periphery of valve body 11. A check valve, preferably, a one way duck bill style check valve 23 is disposed within the radial channel 20 and positioned allowing the entry of fluids and preventing the exit of fluids.

A drip sponge 23*a* may be attached at the outer end of the radial channel 20 of the valve body 11. The drip sponge 23*a* has a central opening allowing insertion of the fill tube 41.

The applicator head 13 may be attached by any suitable means, and is preferably attached by forming a threaded nipple 24 extending outwardly from the valve body 11 suitable for receiving the feed tube 25 of applicator head 13. A retainer ring 26 is located on the feed tube 25 for retaining the applicator head 13 in a fixed relationship to the valve body 11. A retainer nut 27 fits over the retainer ring 26 engaging the threaded nipple 24 retaining the applicator head 13 to the valve body 11.

The reservoir tube 12 has a preferably clear outer tube 30 attached about the reduced diameter portion 16 of the valve body 11. The piston 31 is slidingly disposed within the clear outer tube 30. The piston 31 is sealed against the inner wall of the outer tube 30, preferably using an "O"-ring 32. A piston rod 33 is affixed to the piston 31 and extends outwardly away from the valve body 11 past the distal end of the outer tue 30. A piston handle 34, such as in large knob, may be attached to the piston rod 33 to facilitate operation. A retaining collar 49 is affixed to reservoir tube 12 by a press fit. The retaining collar 49 prevents the piston 31 from inadvertent removal from reservoir tube 12 when the piston rod 33 is fully extended.

The filler lid 39 is made of a plastic material of a size suitable for snap fitting over a paint container 40. The filler lid 39 has a fill tube 41 extending orthogonally upward from its surface. The fill tube 41 extends through the filler lid 39 and has a suction end tube 42 attached thereto.

The suction end tube 42 may be attached by any suitable means such as adhesive, friction, or molded in one piece to the fill tube 41. The suction end tube 42 is of the length so as to reach the bottom of container 40 thereby allowing substantialy all of the paint 43 contained therein to be removed. The suction end tube 42 further terminates in a diagonal end section 44 or similar shape to prevent tube 42 from sucking the bottom of container 40.

The fill tube 41 is attached to the filler lid 39 by any of a number of suitable means such a heat, fusion, adhesive, or friction. The fill tube 41 has a diameter to allow easy insertion through the duck bill style check valve 23 and further to seal on the tapered seal 21 of the valve body 11.

When a paint pad 15 is used to apply the coating to the surface, especially adapted paint pad 15 is used. The paint pad 15 has a feed tube 25 adapted for connection to the threaded nipple 24 of the valve body 11 and an applicator pad 46 pivotally attached thereto. The pad pivot 47 is designed allowing the applicator pad 46 to pivot in a small arc in relation to the feed tube 25 and ratchets through a larger arcuate range.

In its use, the fountain applicator handle 10 is prepared by attaching a suitable applicator head 13 such as a roller type head 14 or fountain type paint pad 15. The roller type head 14 used may be of any conventional design, such as a Power-Flo Roller from Power-Flo Products Corporation, Minneapolis, Minn. Such a roller type head 14 is constructed to accept any one of a number of commercially available roller sleeves 48.

The fountain applicator handle 10 may then be filled with the paint 43 by first inserting the fill tube 41 through the duck bill style check valve 23 of the radial channel 20 thereby sealing the fill tube 41 into the tapered seal 21. The operator, thence, using the piston handle 34 attached to the piston rod 33 causes the piston 31 to move away from the valve body 11 thereby urging the flow of paint 43 upwardly from the paint container 40 through the suction end tube 42 and the fill tube 41 into the inlet portion 18 at the valve body 11 in the reservoir space 12*a*. When the reservoir space 12*a* is full, the piston 31 will abut against the retaining collar 49 preventing the piston 31 from being pulled out of the reservoir tube 12 and spilling the paint 43.

With the reservoir space 12*a* sufficiently filled with the paint 43, the fountain application handle 10 is removed from the fill tube 41 and is ready to apply the paint through the applicator head 13 to the surface being coated. The operator then compresses the reservoir space 12*a* in response to urgings applied to piston handle 34 thereby forcing the paint 43 through the central channel 17 of the valve body 11 and further communicating the paint through the feed tube 25 thence to the applicator head 14. Paint 43 is distributed in the applicator head 14 to the interior thereof and thence to the interior of the roller sleeve 48 and thence transferred to the surface being coated as shown in FIG. 1. The operator may vary the quantity of paint 43 being fed to the applicator head 14 by his actions on the piston handle 34, thus, allowing the operator to provide an effectively continuous flow of paint 43 for coating in an even film of the coating upon the surface.

The operation of the fountain applicator handle 10 is similar when a fountain paint type pad 15 is used to apply the coating. However, as the operator moves the fountain applicator handle 10 angularly through an arc while spreading the coating upon the surface being coated, the pad pivot 47 operates varying the angle between the feed tube 25 and the applicator pad 46, thereby maintaining the pad contact with the surface being painted.

When the reservoir space 12a has been depleted of its supply of paint 43, the reservoir space 12*a* may be refilled by again inserting the fill tube 41 through the duck bill style check valve 23 and the drip sponge 23*a* into the tapered seal 21 and withdrawing the piston 31 causing the flow of the paint 43 into the reservoir space 12*a*. Upon removal of the fill tube, the drip sponge 23*a* wipes the excess paint 43 from the fill tube 41 preventing loss of paint 43 to the environment.

Check valve 23 according to the preferred teachings of the present invention is constructed to be self-closing under zero pressure to prevent exit of fluids therethrough. Specifically, check valve 23 includes an annular lip 60 having an outer edge and an inner edge. The first end 62 of a cylindrical shroud 64 extends perpendicularly from and is integrally formed with the inner edge of annular lip 60. Lip 60 has a size and shape for sealing with shoulder 66 of radial channel 20. Shroud 64 has a free end 68 and has an outer surface 70 having an outer diameter which is slightly smaller than the diameter of radial channel 20. First and second deformable, reed type, flat, valve plates 72 and 74 are provided within shroud 64 and generally include first ends 76 and side edges 78 terminating in and integrally formed with the inside surface 80 of shroud 64. The free, second ends 82 of plates 72 and 74 abut together and form an opening 84. In the most preferred form, opening 84 is located at the free end 68 of shroud 64. In the most preferred form, first ends 76 of plates 72 and 74 are spaced from first end 62 of shroud 64 in the direction of free end 68. Plates 72 and 74 in the most preferred form intersect shroud 64 at an angle in the range of 24°, with the intersection of plates 72 and 74 and shroud 64 being along hyperbolas having ends which intersect at the corners of edges 78 and ends 82 of plates 72 and 74.

In its most preferred form, check valve 23 further includes circumferentially spaced, axially extending, parallel ribs 86 having first ends terminating in and integrally formed in lip 60 and second ends 88 located generally adjacent free end 68 of shroud 64. Ribs 86 in the most preferred form are rectangular in cross section having an inside surface integrally formed on and with outer surface 70 of shroud 64 and having an outside surface 90. The diameter of outside surfaces 90 of ribs 86 is generally equal to but slightly larger than the diameter of radial channel 20 for allowing the press fit of valve 23 within radial channel 20. The thickness of ribs 86 is such that only outer surfaces 90 of ribs 86 engage radial channel 20 and outer surface 70 of shroud 64 is spaced from radial channel 20. For easing placement of check valve 23 within radial channel 20, second ends 88 of ribs 86 are slanted at one angle in the range of 30° from outer surface 70 of shroud 64. In its most preferred form, four ribs 86 are provided spaced 90° from each other, with ribs 86 being 45° from the axis of opening 84 of plates 72 and 74.

In its most preferred form, outer surface 70 of shroud 64 includes first and second axially extending flat surfaces 92 located along a chord of the cylindrical shape of shroud 64, generally perpendicular to the axis of opening 84 of plates 72 and 74 and intermediate ribs 86 on opposite sides of the axis of opening 84.

In its most preferred form, check valve 23 is formed of plastic, particularly pelethane, and specifically, UPJOHN pelethane 2352-70A.

For holding check valve 23 and drip sponge 23*a* in radial channel 20, an annular valve retainer 94 is provided secured in radial channel 20 for sandwiching check valve 23 and drip sponge 23*a* against shoulder shoulder 66 of radial channel 20. In its most preferred form, valve retainer 94 is press fit in radial channel 20.

It can then be appreciated that prior duck bill style check valves utilized back pressure of the fluid to keep the valve closed. Specifically, paint passing through the channel in the first direction pushes against the first surfaces of the first and second plates opening the opening. Paint passing through the channel in the second direction pushes against the second surfaces of the first and second plates closing the opening. Further, prior duck bill style check valves have a tendency to lose their memory for returning to their original condition, especially when opened utilizing fill tube 41 in the environment of the fountain applicator handle 10 of the present invention. A major factor that prior duck bill style check valves lost their memory was their formation from rubber for resistance to breakdown due to exposure to paint and paint cleaning solutions.

It can then be appreciated that after reservoir space 12*a* has been depleted of its supply of paint 43, drops of paint may adhere to the surfaces of longitudinal central channel 17, radial channel 20, and piston 31 and like surfaces. Because of the general lack of back pressure and loss of memory, prior duck bill style check valves had a tendency to allow these drops of paint to exit through the valve if their adhesion to the internal surfaces were broken.

Check valve 23 according to the preferred teachings of the present invention is advantageous in its ability to prevent exit of paint through valve 23. Specifically, the press fitting of ribs 86 into radial channel 20 pulls on shroud 64 which in turn pulls on plates 72 and 74 placing a closing force thereon. It can then be appreciated that opening 84 is held closed by biasing or preloading plates 72 and 74 into their closed position independent of back pressure of the paint. Further, this biasing of opening 84 in its closed position also helps insure that valve 23 prevents exit of paint therethrough in the event of loss of memory of plates 72 and 74. Further, the use of pelethane in forming valve 23 according to the teachings of the present invention helps preserve memory in plates 70 and 72 and valve 23 and has been found to be otherwise particularly advantageous. Particularly, pelethane does not have a tendency to grab or stick to fill tube 41 in a manner as rubber such that there is a loss of a tendency to stretch plates 72 and 74 in the insertion and removal of fill tube 41 from opening 84. Further, pelethane is less expansive than rubber, reducing the material costs for valve 23.

With the improved ability of check valve 23 to prevent exit of paint, a major function of drip sponge 23*a* becomes wiping of paint from fill tube 41 as it is being withdrawn from check valve 23 according to the teachings of the present invention.

After the painting has been completed, the fountain applicator handle 10 may be readily cleaned and purged of the paint by removing the filler lid 39 from the paint container 40 and replacing the filler lid 39 on a container of cleaner, such as water for a water-based paint. Fountain application handle 10 may be then placed over the fill tube 41 and the piston handle 34 withdrawn to draw the cleaning solution into the reservoir tube 12. Piston handle 34 is then depressed, forcing the cleaning solution back into its container. This action may be repeated until reservoir tube 12 has been cleaned of the paint. Additionally, the reservoir tube 12 may be cleaned of the cleaning solution, and the fill tube 41 removed from the valve body 11 so as the cleaning solution may be forced outwardly through the applicator head 13 to purge the coating from the intermediate connectors and the applicator head 13. Its cleaning may conveniently be done when using a water-based coating, by filling the reservoir tube 12 with water and then forcing the water through the applicator head 13 while the applicator head 13 is held under a stream of flowing water, and collecting such cleaning solution for disposal.

The fountain applicator handle 10 may thus be used to apply coatings to any surface whether the surface is vertical, overhead or underfoot.

With proper choice of applicator heads 13, the fountain applicator handle 10 may be used for a multitude of tasks, such as the handle may be used to apply a spray of liquid such as water or a chemical solution to a distant surface when an applicator head 13 of a spray nozzle type is attached. By removing the applicator head 13, the fountain applicator handle 10 may be used as a serviceable displacement type pump by inserting the threaded nipple end 24 into the liquid being moved and withdrawing the piston handle 34 to fill the reservoir tube 12 with the liquid and, thence, moving the fountain applicator handle 10 to the area of discharge and depressing the piston handle 34 thereby purging the liquid from the reservoir tube 12 into another area.

These advantages, usages, and many other usages will be found in real life by those versed in the art, and although various minor modifications may be suggested and employed by those versed in the art, be it known that we wish to embody within the scope of the patent granted hereon all such embodiments reasonably come within the scope of our contributions to the art.

What is claimed is:

1. Fountain application for providing a continuous supply of a liquid coating including a reservoir for storing the liquid coating, a central channel having an inlet in communication with the reservoir and having an outlet, a fill channel having a diameter and extending angularly across and intersecting with the central channel between the inlet and the outlet, and a fill tube in fluid communication with a source of liquid coating, with the improved fountain applicator comprising, in combination: a duck bill style one-way check valve located in the fill channel spaced from the central channel for preventing flow of the liquid coating from the fill channel, with the check valve including at least a first plate defining an opening for allowing insertion of the fill tube into the fill channel; a cylindrical shroud having an outer surface and an inner surface, with the plate located within the cylindrical shroud and intersecting with and being integrally formed with the inner surface of the shroud; ribs formed on the outer surface of the shroud, with the ribs having an outer diameter slightly larger than the diameter of the fill channel and for press fit therein for biasing the opening in a closed position independent of back pressure of the liquid coating; and sealing means located adjacent the intersection of the fill channel with the central channel for sealing with the fill tube when inserted in the fill channel for allowing the liquid coating to pass from the fill tube through the inlet of the central channel into the reservoir and preventing liquid coating flow from the fill tube through the outlet of the central channel and for allowing liquid coating flow in the central channel through the outlet when the fill tube is removed form the fill channel.

2. The fountain applicator of claim 1 wherein the check valve further includes a second plate, with the first and second plates defining the opening.

3. The fountain applicator of claim 2 wherein the opening of the plates defines an axis, wherein four ribs are provided generally spaced 90° from each other and 45° from the axis of the opening of the plates.

4. The fountain applicator of claim 3 wherein the outer surface of the shroud has a generally circular cross section.

5. The fountain applicator of claim 4 wherein the outer surface of the shroud includes axially extending flat surfaces located along a chord of the outer surface, generally perpendicular to the axis of the opening, and intermediate the ribs on opposite sides of the axis of the opening.

6. The fountain applicator of claim 2 wherein the plates are flat and intersect with the inner surface of the shroud along a hyperbola.

7. The fountain applicator of claim 1 wherein the shroud has a first end and a second end; and wherein the ribs are circumferentially spaced and extend axially on the outer surface generally between the first and second ends of the shroud, with the ribs being parallel to each other.

8. Check valve for allowing passage of fluid through a channel in a first direction and for preventing passage of fluid through the channel in a second, opposite direction comprising, in combination: at least a first plate angularly disposed in the channel, with the plate defining an opening, with the plate having first and second surfaces with fluid passing through the channel in the first direction pushing against the first surface of the plate opening the opening and with fluid passing through the channel in the second direction pushing against the second surface of the plate closing in the opening; a shroud having an inner surface and an outer surface with the plate located within the shroud and intersecting with and being integrally with the inner surface of the shroud; and ribs formed on the outer surface of the shroud, with the ribs having a size for receipt in the channel in a press fit manner for preloading the first plate for closing the opening independent of fluid passage in the second direction.

9. The check valve of claim 8 further comprising, in combination: a second plate having first surface and a second surface, with the first and second plates defining the opening, with the fluid passing through the channel in the first direction pushing against the first surfaces of the first and second plates opening the opening and with fluid passing through the channel in the second direction pushing against the second surface of the first and second plates closing the opening, with the shroud being cylindrical in shape, with the second plate located within the shroud and intersecting with and being integrally formed with the inner surface of the shroud.

10. The check valve of claim 9 wherein the inner surface of the shroud has a circular cross section; wherein the first and second plates are flat, with the intersection of the plates with the shroud being along a hyperbola.

11. The check valve of claim 9 wherein the channel includes a shoulder; wherein the check valve further comprises, in combination: means for sealing with the channel comprising a lip extending generally perpendicularly from the outer surface of the shroud and having a size and shape for abutting with the shoulder of channel.

12. The check valve of claim 9 wherein the opening of the plates defines an axis, wherein four ribs are provided generally spaced 90° from each other and 45° from the axis of the opening of the plates.

13. The check valve of claim 12 wherein the shroud has a first end and a second end; and wherein the ribs are circumferentially spaced and extend axially on the outer surface generally between the first and second ends of the shroud, with the ribs being parallel to each other.

14. The check valve of claim 13 wherein the outer surface of the shroud is slightly smaller than the channel; and wherein the ribs have a thickness to space the outer surface of the shroud from the channel.

15. The check valve of claim 14 wherein the ribs have an identical rectangular cross section throughout.

16. The check valve of claim 13 wherein the opening of the plate defines an axis, and wherein the outer surface of the shroud includes axially extending flat surfaces located along a chord of the outer surface, generally perpendicular to the axis of the opening, and intermediate the ribs on opposite sides of the axis of the opening.

17. The check valve of claim 8 wherein the ribs have first ends for insertion into the channel, with the first ends of the rib in the range of 30° slanted away from the outer surface of the shroud for ease of insertion.

18. The check valve of claim 8 wherein the plate has a first end and a second end, with the first end of the plate intersecting with the shroud, with the second end of the plate defining the opening, with the ribs having a first end located axially and radially adjacent the first end of the plate and a second end located axially adjacent but radially spaced from the second end of the plate.

19. The check valve of claim 18 wherein the channel includes a shoulder; wherein the check valve further comprises, in combination: means for sealing with the channel comprising a lip extending generally perpendicularly from the outer surface of the shroud and channel; and wherein the shroud includes a free end opposite to the lip, with the second ends of the ribs located adjacent the free end of the shroud and with the first ends of the ribs terminating in and integrally formed in the lip.

20. The check valve of claim 19 wherein the ribs are circumferentially spaced and extend axially on the outer surface of the shroud, with the ribs being parallel to each other.

* * * * *

UNITED STATES PATENT OFFICE
CERTIFICATE OF CORRECTION

Patent No. 4,810,123 Dated March 7, 1989

Inventor(s) William L. Bruggeman

It is certified that error appears in the above-identified patent and that said Letters Patent is hereby corrected as shown below:

Column 1, line 54 should not be the start of a new paragraph.

Column 9, line 19, cancel "application" and substitute therefor --applicator--.

Column 9, line 51, cancel "form" and substitute therefor --from--.

Column 10, line 20, cancel "in".

Column 10, line 22, after "surface" insert --,--.

Column 11, line 10, after "rib" insert --slanted--.

Column 11, line 10, cancel "slanted".

Signed and Sealed this

Twenty-third Day of May, 1989

*Attest:*

DONALD J. QUIGG

*Attesting Officer* *Commissioner of Patents and Trademarks*